United States Patent

Wagner et al.

[11] Patent Number: 5,522,174
[45] Date of Patent: Jun. 4, 1996

[54] SANITARY BUG CATCHER

[76] Inventors: Vida A. Wagner; George D. Wagner, both of 709 N. Rennick Dr., Apache Junction, Ariz. 85220

[21] Appl. No.: 343,095

[22] Filed: Nov. 21, 1994

[51] Int. Cl.[6] .................................................. A01M 3/02
[52] U.S. Cl. ................................. 43/137; 43/134; 15/187
[58] Field of Search ....................... 43/134, 137; 15/186, 15/187, 188, 207.2

[56]            References Cited

U.S. PATENT DOCUMENTS

| D. 266,689 | 10/1982 | Seidel ......................................... | D22/20 |
| 1,650,548 | 11/1927 | Sullivan ..................................... | 43/137 |
| 2,963,729 | 12/1960 | Thonbo et al. ............................ | 15/187 |
| 3,129,448 | 4/1964 | Mittman ..................................... | 15/187 |
| 3,302,230 | 2/1967 | Poppelman ................................ | 15/187 |
| 3,744,078 | 7/1973 | Vallis ........................................ | 15/187 |
| 3,905,146 | 9/1975 | Ralston ..................................... | 43/137 |
| 3,984,937 | 10/1976 | Hamilton ................................... | 43/137 |
| 4,242,828 | 1/1981 | Schurger et al. .......................... | 43/137 |
| 4,325,392 | 4/1982 | Iten .......................................... | 15/187 |
| 4,593,489 | 6/1986 | Gott ......................................... | 43/137 |
| 5,052,967 | 10/1991 | Slatter et al. ............................. | 446/73 |
| 5,207,018 | 5/1993 | Reaver et al. ............................. | 43/137 |

FOREIGN PATENT DOCUMENTS

| 1223871 | 6/1960 | France .................................... | 15/187 |
| 0590097 | 3/1959 | Italy ....................................... | 15/187 |

*Primary Examiner*—Richard K. Seidel
*Assistant Examiner*—James Miner
*Attorney, Agent, or Firm*—David L. Baker; Rhodes & Ascolillo

[57]            ABSTRACT

The invention is a hand tool for killing and disposing of bugs that walk, crawl or hop and includes an elongated handle with a trapezoidally shaped paddle on one end. The handle is mounted centrally on one side of the paddle. The other side of the paddle contains spikes one half inch in length and spaced with a density of one hundred per square inch. The handle is reinforced so that an impaled bug will be dislodged with a sharp rap on the side of a trash barrel. The entire tool is a single piece of molded plastic.

7 Claims, 2 Drawing Sheets

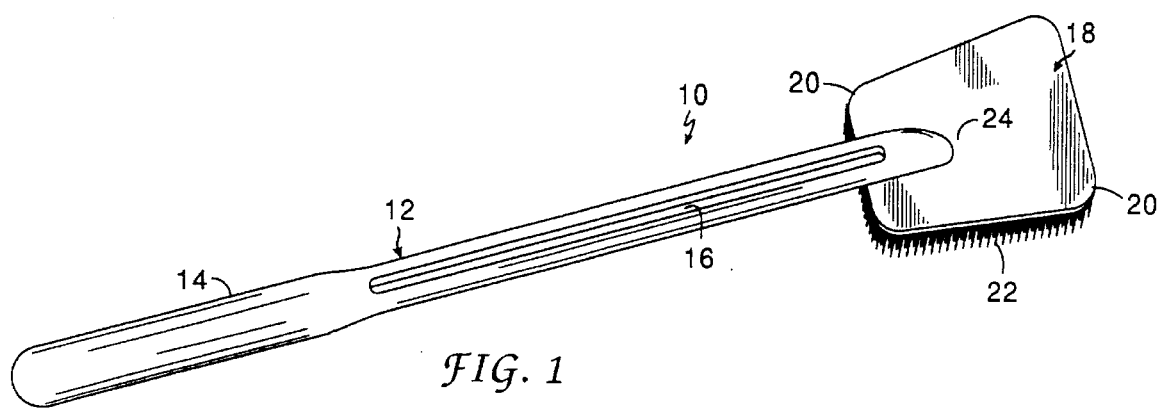
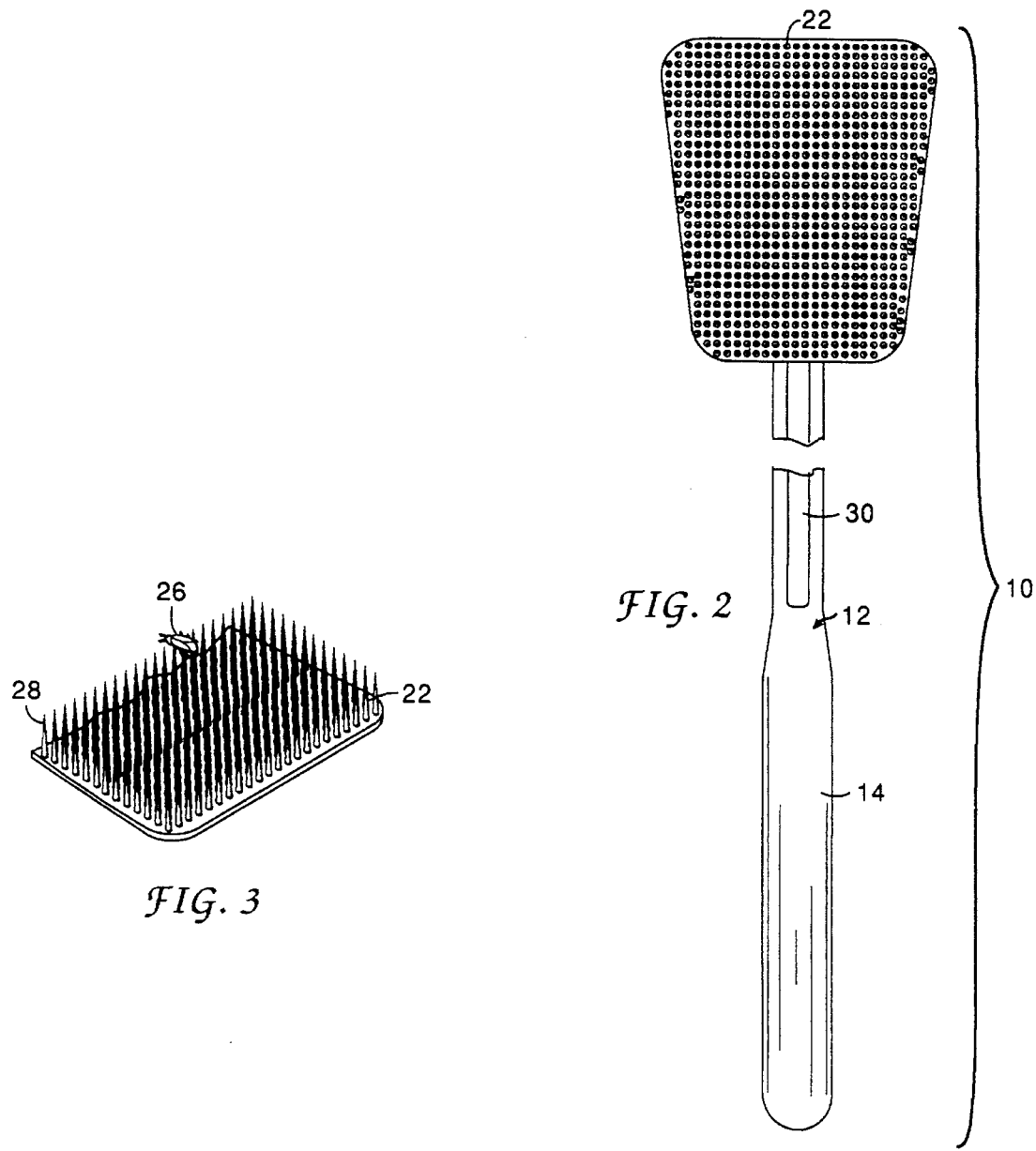

5,522,174

SANITARY BUG CATCHER

BACKGROUND OF THE INVENTION

1. Field of the Invention

This invention relates generally to an apparatus for catching bugs and more particularly to an apparatus that will impale and slay bugs that walk, hop or crawl.

2. Description of the Prior Art

There is nowhere in the world that one can live and totally and completely avoid the presence of bugs. New York has the cockroach, California the palmetto bug and date beetle and the Southwest the scorpion and tarantula. Every area of the world has a plethora of other bugs too big and ugly to step on or pick up and remove and too small to shoot. Chemical eradication is hampered by pollution laws and fears of toxic waste. One solution aimed at assisting the home owner or renter is a new and effective hand tool that will instantaneously dispatch the unwanted critter and allow his dirty, germ filled carcass to be carried to the trash barrel or toilet bowl and with a flick of the wrist be deposited without further ado.

A number of U.S. Patents have been issued for devices that are hand held and operate without electrical current for lights, shocking devices or fume dispensing gases. Many of these Patents are related to devices for swatting flying insects. The invention about to be described would be relatively ineffective for swatting flying bugs or insects in that the air ahead of the paddle would tend to warn the insect, who could then easily escape. U.S. Pat. No. 3,905,146 issued Sep. 16, 1975 to Ralston discloses a fly swatter that is nothing more than a pocket size tube containing a plurality of strikers which join and pivot at one end and expand into a fan like structure to swat flies. U.S. Pat. No. 4,242,828 issued Jan. 6, 1981 to Schurger et al. shows a conventional looking fly swatter with a recess in the handle to accommodate a tweezers like tool for picking up dead flies. U.S. Pat. No. Des. 266,689 issued Oct. 26, 1982 to Seidel shows a fly swatter with an ornamental design that resembles a fly on the working end of the handle. A novelty and entertaining device that simulates the smashing of a fly or other insect is shown in U.S. Pat. No. 5,052,967 issued Oct. 1, 1991 to Slatter et al.. U.S. Pat. No. 5,207,018 issued May 4, 1993 to Reaver et al. shows a combination fly swatter and insect trap where the instrument contains an aperture that is placed around the insect and a housing over the aperture allows the insect to be captured by a slidable panel which seals the aperture.

The prior art of which Applicants are apprised fails to show any type, style or design of hand tool for catching and eradicating bugs that is similar to or even suggestive of the tool described and claimed herein.

SUMMARY OF THE INVENTION

The invention is directed to a long handled, paddle like device that contains, on one side, a plurality of spike-like projections, one half inch in length and numbering one hundred to the square inch. The handle is designed to intersect the spike free or back side of the paddle proximate the center point. The handle extends up and away from the paddle for about fourteen inches. The handle is reinforced to allow it to be rapped against the edge of a toilet bowl or trash barrel without damage. The shape and design of the handle allows the user to better view the bug as it is attacked thereby increasing the accuracy and decreasing the need for multiple strikes to complete the task. Tapered spikes easily release the bug after the handle is rapped as suggested. Ordinarily the bug will not fall off without a rap due to the density of the spikes.

It is therefore an object of the invention to provide a new and improved sanitary bug catcher.

It is another object of the invention to provide a new and improved bug catcher that is safe to use.

It is a further object of the invention to provide a new and improved bug catcher that is strong in design and capable of being built of materials that will insure durability.

It is still another object of the invention to provide a new and improved bug catcher that will catch multiple bugs at the same time.

It is still a further object of the invention to provide a new and improved bug catcher that utilizes low cost materials in manufacture and hence may be sold to the consuming public for a low price.

It is another object of the invention to provide a new and improved bug catcher that kills the bug and removes it at the same time.

It is another object of the invention to provide a new and improved bug catcher that does not require the user to handle the bug.

These and other advantages, features and objects of the invention will become more apparent from the following description taken in connection with the illustrative embodiment in the accompanying drawings.

DETAILED DESCRIPTION OF A PREFERRED EMBODIMENT

Figure 1:
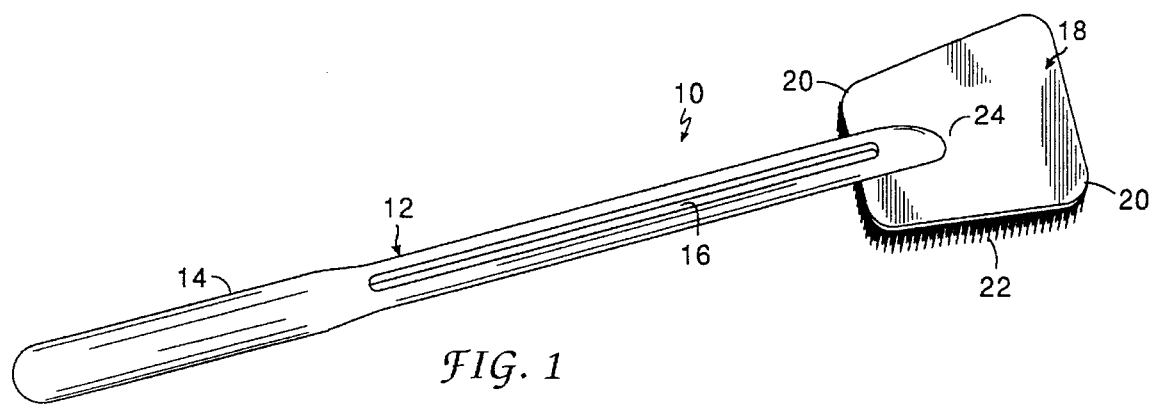
FIG. 1 is a perspective view of the back side of the invention.

Referring now to FIG. 1, the invention is shown generally at 10. The invention consists of a handle 12 with a hand grip 14 and a raised reinforced portion 16. The paddle 18 is trapezoidal in shape with rounded corners 20 and supports the spikes 22. Spikes 22 are molded into and formed as a part of the paddle during manufacture. The handle 12 is molded with the paddle 18 and joins the paddle at the proximate mid-point 24. The handle 12 arches up and away from the paddle 18 thereby allowing the user to obtain a better view of the bug to be dealt with and giving a more powerful blow for the stroke over a handle connected at the edge. A further advantage of the central handle mounting is that the plane of the end of the spikes is parallel to the surface where the blow is delivered thereby eliminating the possibility that the spikes will strike on an angle and the bug escape its fate.

Figure 2:
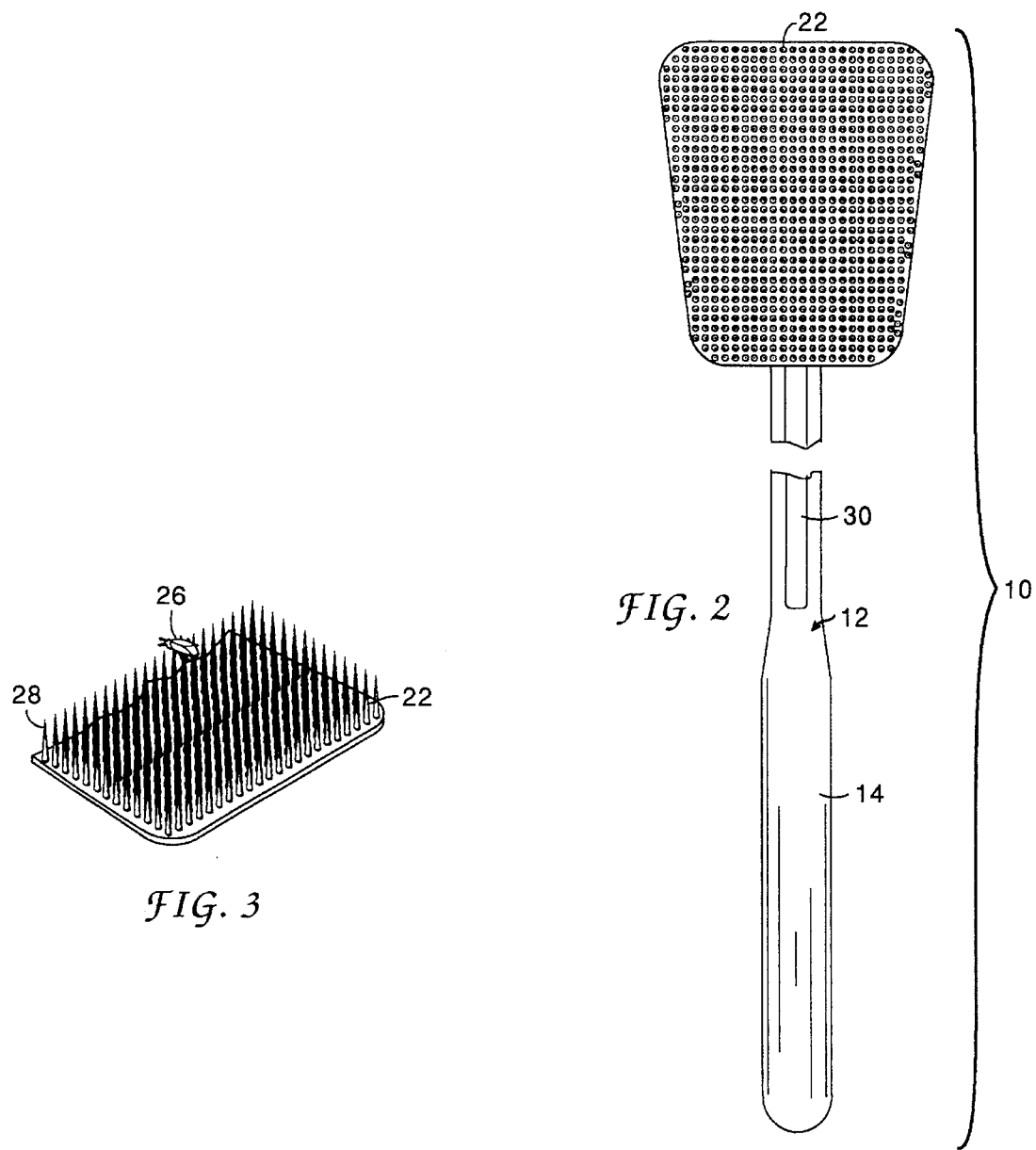
FIG. 2 is a top plan view of the front side of the invention.

In FIG. 2, the handle 12 is shown with a hand grip 14 and a recessed area 30 which will lessen the weight of the handle in an area where it is reinforced, without giving up the extra strength added by the reinforcing section 16 in FIG. 1. The spikes 22 are shown completely covering the face of the paddle at the rate of one-hundred per square inch. The handle is in the order of fourteen inches in length and the paddle is three and one half inches long and three inches at the widest point and two inches and the narrowest point.

Figure 3:
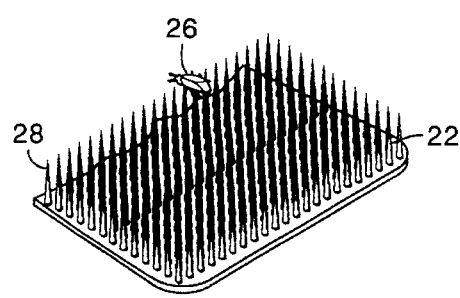
FIG. 3 is a perspective view of the spike pad of the invention.

FIG. 3 shows the spike pad 22 with a bug 26 impaled on one or more of the spikes 28. The individual spikes are one half inch in length and conical in shape. The invention is made from molded plastic and may be cleaned of bug residue by either swishing in the clean water of the toilet bowl or simply rinsing it under the faucet of any convenient sink.

The invention is a simple, convenient and easy way to rid a dwelling of unwanted bugs in a manner that is least offensive to the user who may be more reluctant to attend to a dead bug than a live one.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A hand tool for catching and disposing of walking, crawling and hopping bugs comprising:

a trapezoidal-shaped paddle having:
       a plurality of conical-shaped spikes on one side; and
       a handle connection on another side;
    a handle including:
       an extended member; and
       a hand grip on an end of the handle distal from the paddle; and
    means for reinforcing the handle on the extended member between the hand grip and the paddle connection; and
    a weight reducing groove in the extended member.

2. A hand tool for catching and disposing of bugs according to claim 1 wherein the paddle has rounded corners.

3. A hand tool for catching and disposing of bugs according to claim 1 wherein the said spikes are one half inch in length.

4. A hand tool for catching and disposing of bugs according to claim 3 wherein: the spikes have a density of one hundred per square inch.

5. A hand tool for catching and disposing of bugs according to claim 1 wherein the handle is fourteen inches in length.

6. A hand tool for catching and disposing of bugs according to claim 1 wherein the handle, paddle and spikes are formed of one piece.

7. A hand tool for catching and disposing of bugs according to claim 1 wherein the handle, the paddle and the means for reinforcing the handle are formed of molded plastic.

\* \* \* \* \*